May 9, 1950     H. E. HELBIG     2,506,959
CIRCLE CUTTING ATTACHMENT FOR BAND SAW MACHINES
Filed June 24, 1946     2 Sheets-Sheet 1

INVENTOR
H. E. HELBIG
BY
Merrill M. Blackburn.
ATTORNEY

May 9, 1950 H. E. HELBIG 2,506,959
CIRCLE CUTTING ATTACHMENT FOR BAND SAW MACHINES
Filed June 24, 1946 2 Sheets-Sheet 2

INVENTOR
H. E. HELBIG
BY
Merrill M. Blackburn.
ATTORNEY

Patented May 9, 1950

2,506,959

UNITED STATES PATENT OFFICE 2,506,959

CIRCLE CUTTING ATTACHMENT FOR BAND-SAW MACHINES

Harley E. Helbig, Davenport, Iowa

Application June 24, 1946, Serial No. 678,924

2 Claims. (Cl. 143—26)

My present invention relates to an attachment for use on band saw machines for cutting circles, particularly in instances where a number of circular parts of the same size are desired. Among the objects of this invention are the provision of an apparatus of the type indicated which can be readily attached to and detached from the table of a band saw machine; the provision of a structure of the type indicated which can be readily adjusted for cutting circles of different diameters; the provision of a structure of the type indicated which can be readily removed from the band saw table when it is desired to use the machine for a different purpose; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Figure 1:
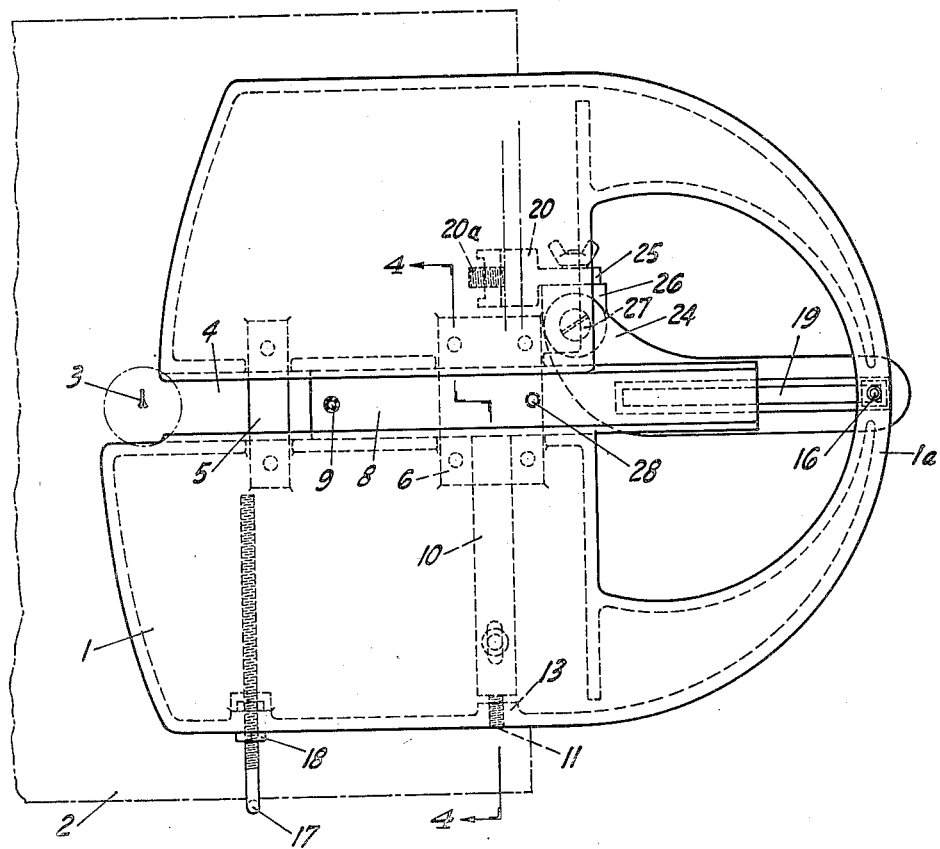
Fig. 1 is a plan view of an apparatus embodying my invention, the same being shown applied to a band saw machine which is shown in broken lines.
Figure 2:
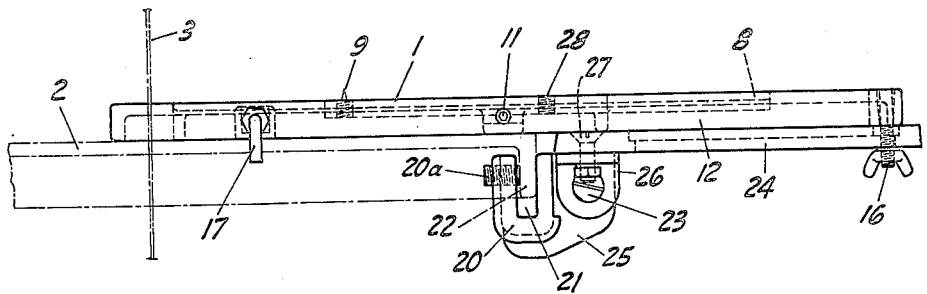
Fig. 2 is a side elevation of the structure shown in Fig. 1.
Figure 3:
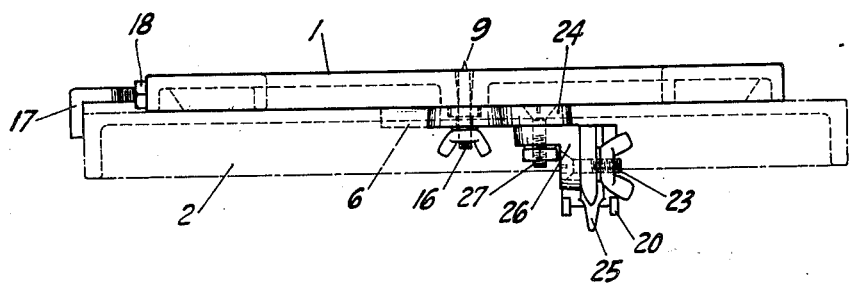
Fig. 3 is an elevation taken at a right angle to the view shown in Fig. 2.

Reference will now be made in greater detail to the annexed drawings for a more complete description of this invention. The plate 1 of my improvement is shown as resting on the table 2 of a band saw machine, of which a fragmentary portion of the blade is shown at 3. The plate 1 is shown as having a slot 4 which extends substantially entirely across the plate, the two portions of which are connected by the straps 5 and 6 secured to the under face thereof. If more than two straps should be found desirable, such can be provided but, at the present time, it is thought that two straps, together with the unsevered part 1a, will furnish ample connection for the two halves of the plate.

As indicated at 7, the plate 1 may be rabbeted for the reception of similarly rabbeted edges of the slide 8 which carries the pilot or pilot point 9 designed to enter an approximately centrally placed opening in a work piece from which a circular member is to be cut out, as discolsed by Ward Patent No. 2,157,310, issued May 9, 1939. In order to secure the plate 1 and the slide 2 against relative motion, after the desired radius has been set, slide 10 may be moved inwardly against the edge of slide 8 by means of a set screw 11 extending through the downwardly extending flange 12 of the plate 1 and through a boss on the inner face thereof. When the point 9 has been set at the proper distance from the saw blade 3, by moving the slide 8 relatively to the plate 1, the set screw 11 is turned in to force the slide 10 against the edge of the slide 8. This will then hold the parts in relative adjustment.

Figure 4:
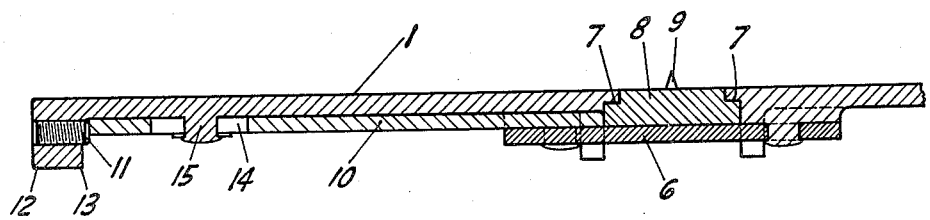
Fig. 4 represents a transverse section substantially along the plane indicated by the line 4—4, Fig. 1.

The slide 10 is provided with a slot 14 for the reception of a stud 15 projecting downwardly from the underside of the plate 1 and this makes possible the endwise movement of the latching plate 10 which, as shown clearly in Fig. 4, abuts against the edge of the slide 8. In order for the sawing to be done perfectly, the cutting edge of the saw 3 should be in alignment with the pivot pin 9 and the pivot bolt 16. In order to conserve time in setting up the parts for cutting circles, the stop member 17 can be screwed in or out until the downwardly projecting end thereof will engage the edge of the table 2 and stop the plate at the proper point. When this has been done, the nut 18 may be tightened up to hold the parts against inadvertent displacement. Thereafter, when the plate is removed from the table and is again replaced thereon, all that is necessary is to pass the bolt 16 through the slot 19, put the wing nut on the bolt 16, and swing the plate 1 until the stop 17 engages the edge of table 2. All of the parts are then ready to go to work, unless it is necessary to adjust the pivot pin 9 with relation to the saw.

Figure 5:
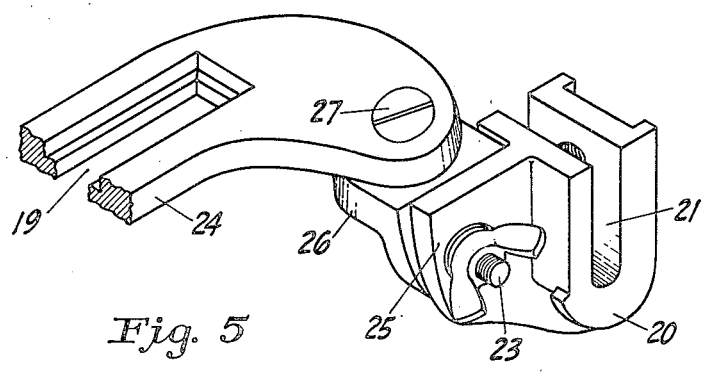
Fig. 5 is a fragmentary perspective view of the attaching device by means of which the plate of my invention is attached to the table of a band saw machine.

In order to secure the plate immovably to the table, a U-shaped securing means 20, having the slot 21 in its upper face, is provided, and this has a set screw 20a extending through one arm of the U-shaped securing means and engaging the flange 22 on the under face of the table 2. Pivotally attached to the clamp or securing means 20 by means of the bolt 23 is an arm 24, in which the slot 19 is located. Intermediate between the arm 24 and the flange 25 on the clamp 20 is an angle bracket 26 which, as shown in Fig. 5, is pivotally connected to the arm 24 by the bolt 27. It will be seen that, from the construction just described, it will be possible to loosen the nut on the bolt 23 and turn the bracket 26 and arm 24 downwardly out of the way when it is not desired to utilize the circle-cutting attachment. However, the clamp 20, together with parts 23 to 27, inclusive, may remain attached to the table ready to be brought up again into operative position as soon as desired. An additional hole 28 is provided in the slide 8 for the reception of the pivot pin 9 in event it is desired to cut a circle having a larger radius than can be cut with the apparatus set up as shown in the drawings.

It is of course understood that the specific description of structure set forth above may be departed from without departing from the spirit of this invention as disclosed in this specification and as defined in the appended claims.

Having now described my invention, I claim:

1. In a structure for the purpose stated, a plate to be supported on the table of a band saw machine, said plate having an opening therethrough extending from the vicinity of the band saw, when the plate is mounted on the table, nearly to the opposite edge of the plate, holding means spanning said opening and connecting the two opposite sides of the plate to hold them against relative movement, a slide movable longitudinally in said opening to adjust the position of the slide, a pivot pin carried by said slide, said pivot pin being adjustable relatively to the band saw by adjusting the position of the slide, means for securing the slide in adjusted position, and means for adjusting the plate relatively to the table, said last named means comprising a clamp to be attached to a flange of the table, and an arm pivotally connected to the clamp and extending beyond the edge of the table, said arm having a longitudinal slot for the reception of a securing means whereby the plate is connected to the arm, and the arm and plate being tiltable about the pivotal connection between the clamp and arm to a position in which the plate is located laterally from the edge of the table top.

2. An attachment for a band saw table comprising a plate slotted substantially from end to end and reenforced marginally and transversely by downwardly extending flanges, said plate having bridges extending transversely of the longitudinal slot, a slidable member adjustable longitudinally of the slot and having rabbeted connection with the edges thereof, means for engaging an edge of the slide member to hold the same in adjusted position, the upper face of the slide being coplanar with the upper face of the plate, a pivot pin near one edge of the slide and serving as a pivot about which a work piece mounted thereon may be turned, a clamp attachable to an edge flange of the table, said clamp having an attaching unit connected thereto by a horizontal pivot for pivotal motion in a vertical direction, and a supporting arm connected to the attaching unit for swinging movement in a horizontal direction.

HARLEY E. HELBIG.

REFERENCES CITED

The following references are of record in the file of this patent:

UNITED STATES PATENTS

| Number | Name | Date |
| --- | --- | --- |
| 149,654 | Hanna | Apr. 14, 1874 |
| 403,618 | Springstead | May 21, 1889 |
| 724,433 | Catudal | Apr. 7, 1903 |
| 1,513,743 | Clausing | Nov. 4, 1924 |
| 1,956,912 | Tate et al. | May 1, 1934 |
| 2,157,310 | Ward | May 9, 1939 |
| 2,394,789 | Lavoie | Feb. 12, 1946 |

FOREIGN PATENTS

| Number | Country | Date |
| --- | --- | --- |
| 342,792 | Great Britain | Feb. 12, 1931 |